United States Patent
Collier et al.

(10) Patent No.: US 6,975,593 B2
(45) Date of Patent: Dec. 13, 2005

(54) METHOD FOR TRIGGERING FLOW CONTROL PACKETS

(75) Inventors: Josh D. Collier, Winchester, MA (US); Ryan P. Abraham, West Townsend, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 979 days.

(21) Appl. No.: 09/824,964

(22) Filed: Apr. 3, 2001

(65) Prior Publication Data

US 2002/0150049 A1  Oct. 17, 2002

(51) Int. Cl.$^7$ .............................................. G01R 31/08
(52) U.S. Cl. ...................................... 370/236; 370/412
(58) Field of Search .............................. 370/351–353, 370/229–240, 395.2, 395.21, 395.43

(56) References Cited

U.S. PATENT DOCUMENTS 6,347,337 B1 * 2/2002 Shah et al. .................. 709/224

OTHER PUBLICATIONS

Stallings, High-Speed Networks TCP/IP and ATM Design Principals, 1998, Prentice-Hall, Inc. PP:88, 366-376.*
Stevens, TCP/IP Illustrated, vol. 1, 1994, Addison Wesley Longman, Inc., PP: 285-286, 310-316.*
InfiniBand™ Architecture Specification vol. 1, Release 0.9, Mar. 31, 2000, Published by InfiniBand$^{SM}$Trade Association.
InfiniBand™ Architecture Specification vol. 2A, Release 0.9, Apr. 7, 2000, Published by InfiniBand$^{SM}$Trade Association.

* cited by examiner

Primary Examiner—David Vincent
(74) Attorney, Agent, or Firm—Park, Vaughan & Fleming LLP

(57) ABSTRACT

A method triggers the transmission of a flow control packet between a receiving device and a sending device on the basis of space available to receive data in a buffer associated with the receiving device. The method increases throughput in a system that requires a flow control packet every predetermined number of clock cycles.

16 Claims, 8 Drawing Sheets

METHOD FOR TRIGGERING FLOW CONTROL PACKETS

TECHNICAL FIELD

The present invention relates to methods for controlling flow of data, and more particularly, to a method for triggering flow control packets on the basis of an increase in availability of free space in the receiving buffer.

BACKGROUND ART

In communication networks, the process of adjusting the flow of data, which is commonly transmitted as data packets, from one network device or node to another is referred to as flow control. Flow control is necessary to ensure that the receiving device can handle all of the incoming data, especially when the sending device is capable of sending data faster than the receiving device can use it.

In most networks, when there is a transfer of data between two devices operating at different speeds, a buffer is used to temporarily store the incoming data until the receiving device is ready to process it. Buffers have limited storage capacity and, consequently, flow control mechanisms are employed to prevent incoming data packets from being lost or dropped due to a lack of free space in the buffer.

A common flow control mechanism (or protocol) used for asynchronous communication in a network is called XON/XOFF. In accordance with this protocol, the receiving device sends a data packet containing an XOFF message to the sending device when the receiver's buffer is full. Such a data packet is called a flow control packet. A flow control packet is limited to a small number of bits and only contains enough information to describe the state of data flow. The sending device then discontinues the transmission of data. After a predetermined period of time, if the receiving device is ready to receive more data, it transmits a flow control packet containing an XON message to the sending device and data transmission is resumed.

SUMMARY OF THE INVENTION

A method for triggering the transmission of a flow control packet between a receiving device and a sending device in a communication network includes determining an amount of free space in a buffer associated with the receiving device. A flow control packet is sent to the sending device in response to a determination that the free space available in the buffer has increased above the threshold. The flow control packet in one embodiment includes an amount indicative of the available free space. In a preferred embodiment, the method is used in a network that requires a receiving device to send a sending device a flow control packet at least once every predetermined number of clock cycles.

A method for triggering the transmission of a flow control packet between a receiving device and a sending device in a communication network may according to one embodiment of the invention include a threshold at a predetermined level. The method determines whether the amount of free space has fallen below a bottom threshold and increased above the predetermined level. Responsive to that determination, a flow control packet is sent.

In a preferred embodiment of the invention, a variable free space amount is set to the lowest level of free space available monitored in the buffer since a flow control packet was last sent. The threshold, above which a flow control packet is triggered, equals the variable free space amount plus a predetermined offset. The variable free space amount is updated as the amount of free space becomes less than the current value of the variable free space amount.

A sending device that sends enough data to a receiving device to fill the buffer at the receiving device will stop sending data, unless it learns of free space in the buffer. Rather than wait for the predetermined number of clock cycles to receive a flow control packet with an indication of the amount of available free space, in accordance with embodiments of the invention such a flow control packet is sent when the amount of available free space increases above a threshold.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
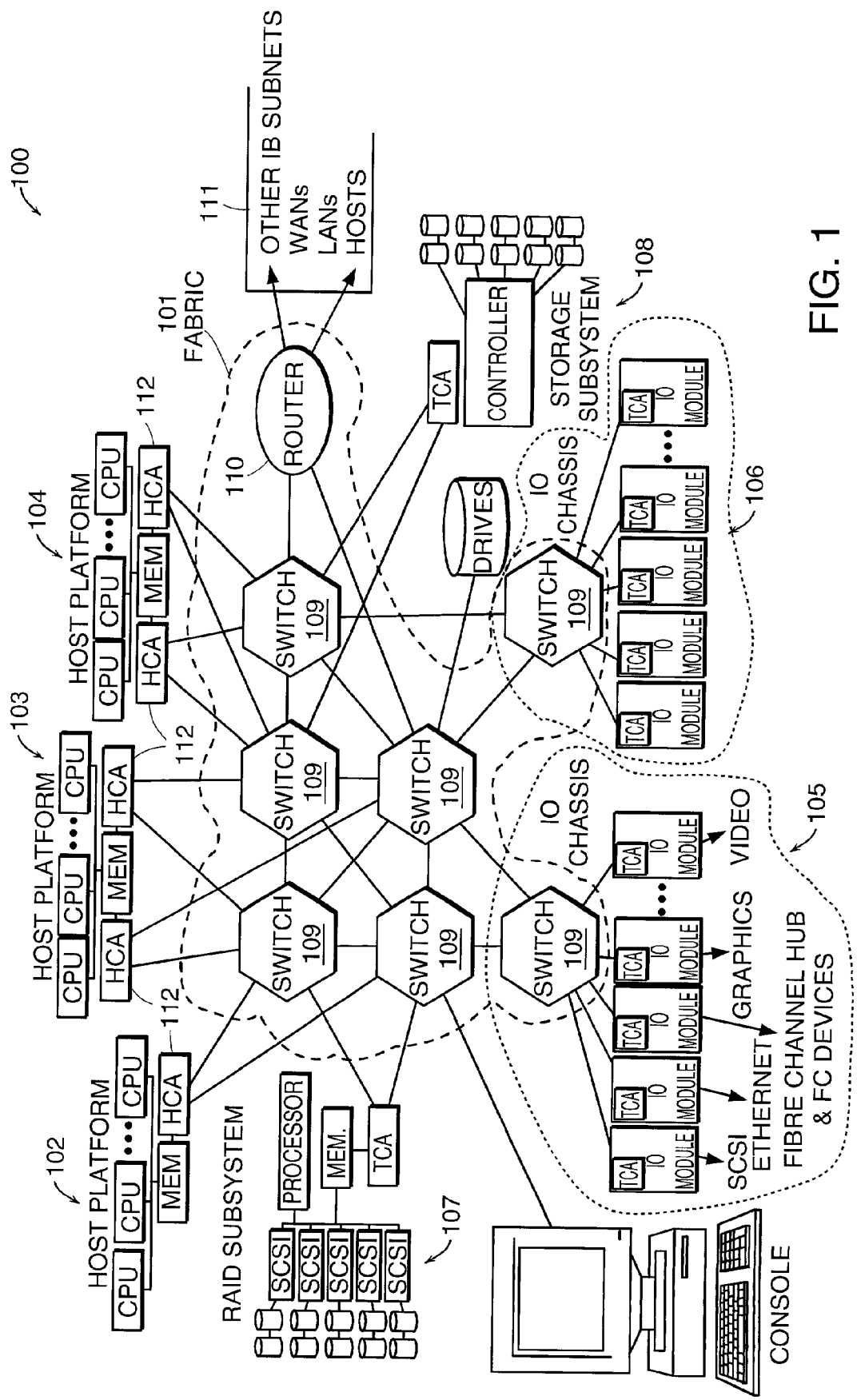
FIG. 1 is shown a block diagram illustrating a system area network in which an embodiment of the present invention may be employed.

In communication networks aimed at facilitating data packet transmission to a receiving buffer without causing buffer overflow in the receiving device, flow control is achieved by configuring the receiving device such that it transmits a flow control packet at predetermined time intervals. The flow control packet informs the sending device of the amount of free space available in the buffer. One such network is the Infiniband™ Architecture developed by the Infiniband$^{SM}$ Trade Association, the specification for which is incorporated herein by reference. The Infiniband™ Architecture defines a system area network for connecting multiple independent processor platforms (i.e., host processor nodes), input/output ("IO") platforms, and IO devices as is shown in FIG. 1. The system 100 is a communications and management infrastructure supporting both IO and interprocessor communications for one or more computer systems. The system 100 can range from a small server with one processor and a few IO devices to a massively parallel supercomputer installation with hundreds of processors and thousands of IO devices. In addition, the IP (Internet protocol) friendly nature of the architecture allows bridging to an Internet, intranet, or connection to remote computer systems 111.

The Infiniband architecture defines a switched communications fabric 101 allowing many devices to concurrently communicate with high bandwidth and low latency in a protected, remotely managed environment. The system 100 consists of processor nodes 102, 103, and 104 and IO units 105, 106, 107, and 108 connected through the fabric 101. The fabric is made up of cascaded switches 109 and routers 110. IO units can range in complexity from a single attached device, such as a SCSI or LAN adapter to large memory rich RAID subsystems 107.

The foundation of the Infiniband operation is the ability of a client process to queue up a set of instructions that hardware devices, such as a channel adapter 112, switch 109, or router 110 execute. This facility is referred to as a work queue. Work queues are always created in pairs consisting of a send work queue and a receive work queue. The send work queue holds instructions that cause data to be transferred between the client's memory and another process's memory. The receive work queue holds instructions about where to place data that is received from another process. Each channel adapter 112 may provide a plurality of queue pairs, each of which provide an independent virtual communication port for a client. These virtual communication ports support a plurality of buffering interfaces referred to as virtual lanes.

The virtual lanes provide a mechanism for creating multiple virtual links within a single physical link. Each virtual lane represents a set of send and receive buffers in a port, and each port may support up to sixteen virtual lanes. The sixteenth lane is reserved for subnet management and lanes one through fifteen are used for data transmission. More information regarding virtual lane buffers at a receive link can be found in co-pending U.S. application Ser. No. 09/782,479, filed Feb. 13, 2001 and issued Jul. 20, 2004 as U.S. Pat. No. 6,766,464, the full disclosure of which is hereby incorporated by reference herein.

Infiniband is an example of a system that requires a flow control packet be sent at least once every predetermined number of clock cycles. In accordance with the Infiniband specification, a flow control packet for a given virtual lane must be transmitted prior to the passing of 65,536 symbol times since the last time a flow control packet for the given lane was transmitted. A symbol time is defined as the time required to transmit an eight bit data quantity onto the send/receive link. This is true regardless of whether the receive buffer has space available for data transmission prior to the passage of the 65,536 symbol times.

Depending on the availability of packet buffering advertised by the receiving device at the time of the transmission of the last flow control packet, the Infiniband send/receive link may stall with respect to sending data packets even if more packet buffering space has become available since the transmission of the last flow control packet. This is because the sending device is unaware of the newly available buffer space. Typically, the sending device will wait for the next flow control packet to advertise buffer availability before resuming transmission of data packets. Decreasing the predetermined time period between flow control packet transmissions results in reduced bandwidth because of the additional flow control packet transmissions without correlation to an increase in available buffer space.

Figure 2:
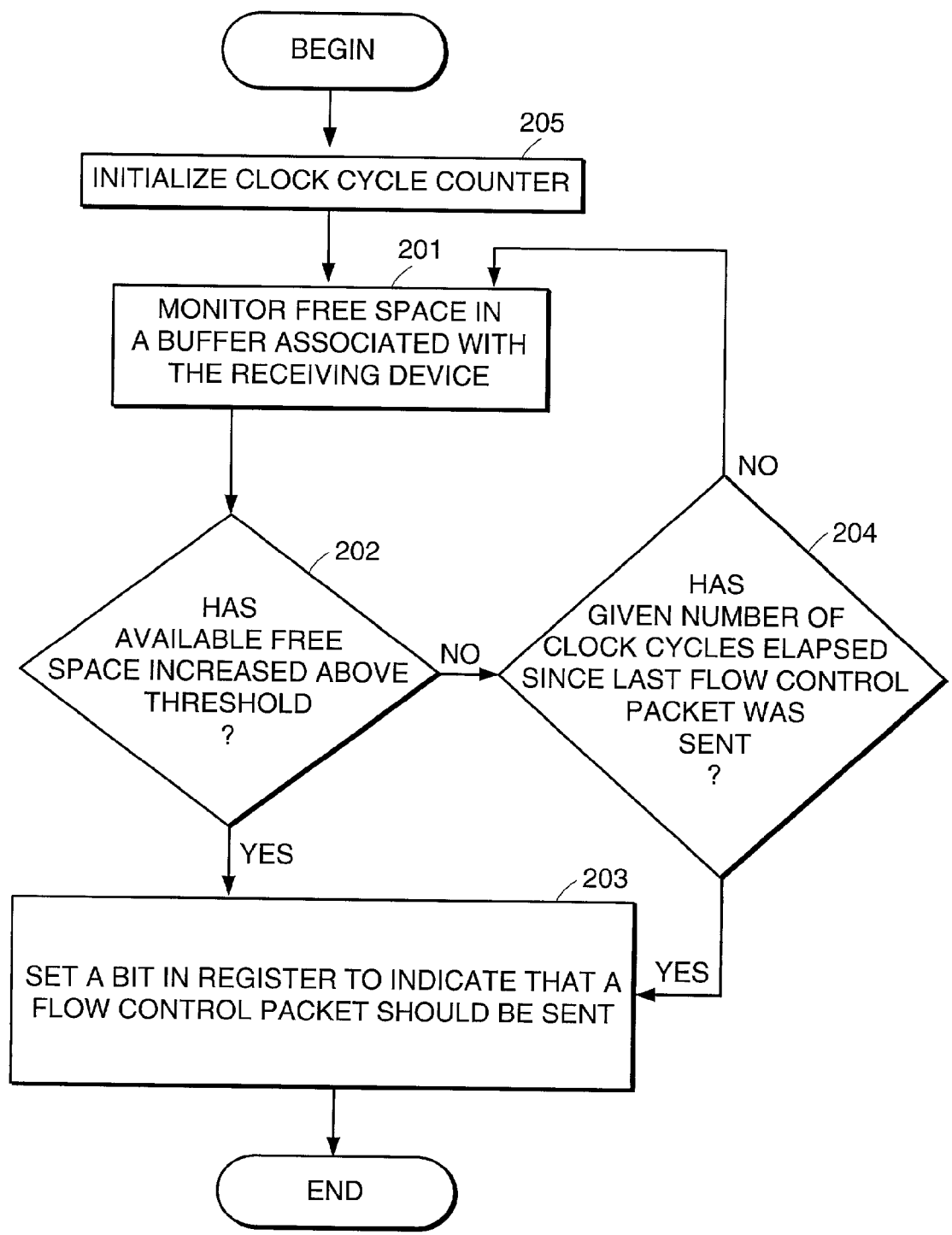
FIG. 2 is a flow chart illustrating one embodiment of the invention.

Embodiments of the invention provide methods for increasing bandwidth and decreasing latency by eliminating the limitations of time based flow control mechanisms such as that used in connection with the Infiniband system. FIG. 2 is a flow chart illustrating a method of triggering a flow control packet based on buffer space availability, that may be used particularly in systems requiring periodic flow control packets at least every predetermined time interval as is the case in the Infiniband system, for example. In accordance with this embodiment, the free space in a buffer associated with the receiving device, (such as the virtual lane buffers described above) is monitored to determine how much free space is available in the buffer in process 201. A comparison is made to determine if the available free space in the receiving buffer has increased above a threshold 202. If so, a bit in a register associated with the sending portion of the receiving device is set in process 203 to indicate that a flow control packet should be sent. A flow control packet will be assembled and sent in response to the bit as soon as the sending portion of the receiving device has time available. If the sending portion is in the middle of sending out a long data packet, it will complete that task before sending the flow control packet.

A flow control packet typically includes an amount indicative of the amount of free space available in the receiving buffer. In accordance with the Infiniband system specification, the amount is provided by Flow Control Credit Limit (FCCL). This amount is a combination of the number of data blocks received and the amount of available free space. A 12 bit Adjusted Block Received counter is maintained for the receiving buffer in each virtual lane. The counter is initially set to zero. The counter is synchronized with the sending node when it learns the total number of blocks transmitted by the sender to the receiving buffer. In Infiniband, this number, Flow Control Total Blocks Sent (FCTBS), is also contained in a flow control packet. Thus, according to Infiniband, a flow control packet includes sending information—total blocks sent—in addition to receiving information—free space available. The counter in the receiving node is set to the FCTBS from the sending node when a flow control packet is received. Until then though, the counter is incremented each time the receiving buffer receives a data packet, unless the data packet is dropped for lack of buffer space.

In creating a flow control packet, the FCCL of Infiniband is basically set to the Adjusted Blocks Received counter amount plus the amount of available free space quantified in modulo 4096. If the available free space exceeds 2048 blocks of data, the FCCL is set to the counter amount plus 2048 modulo 4096. The FCCL informs the sending node of the amount of available free space. The sending node determines, in light of the amount of data blocks transmitted to the receiving buffer, whether the receiving buffer has room for additional packets. At the sending node, if a data packet is available for transmission, then the last FCCL received minus the sum in modulo 4096 of the total number of data blocks sent since link initialization plus the amount of data blocks in the data packet to be sent is compared with 2048 and if it is less than or equal, the data packet may be transmitted.

In summary, the flow control packet provides the sender with information on the available free space in the receiving buffer. The sender can then send data packets when it determines that space will be available in the receiving buffer.

When used in a system such as Infiniband, if the available free space does not trigger a flow control packet, a time counter needs to be checked to make sure a given number of clock cycles have not elapsed since the last flow control packet was sent 204. In Infiniband, each component must use a given number of clock cycles that is no greater than 65,536 symbol times. If the given number of clock cycles have elapsed, the time maximum triggers a flow control packet 203. Otherwise, free space in the receiving buffer continues to be monitored 201. Whenever a flow control packet is sent, the process begins again and the clock cycle counter is initialized 205 and monitoring of free space in the receiving buffer resumes.

Figure 3:
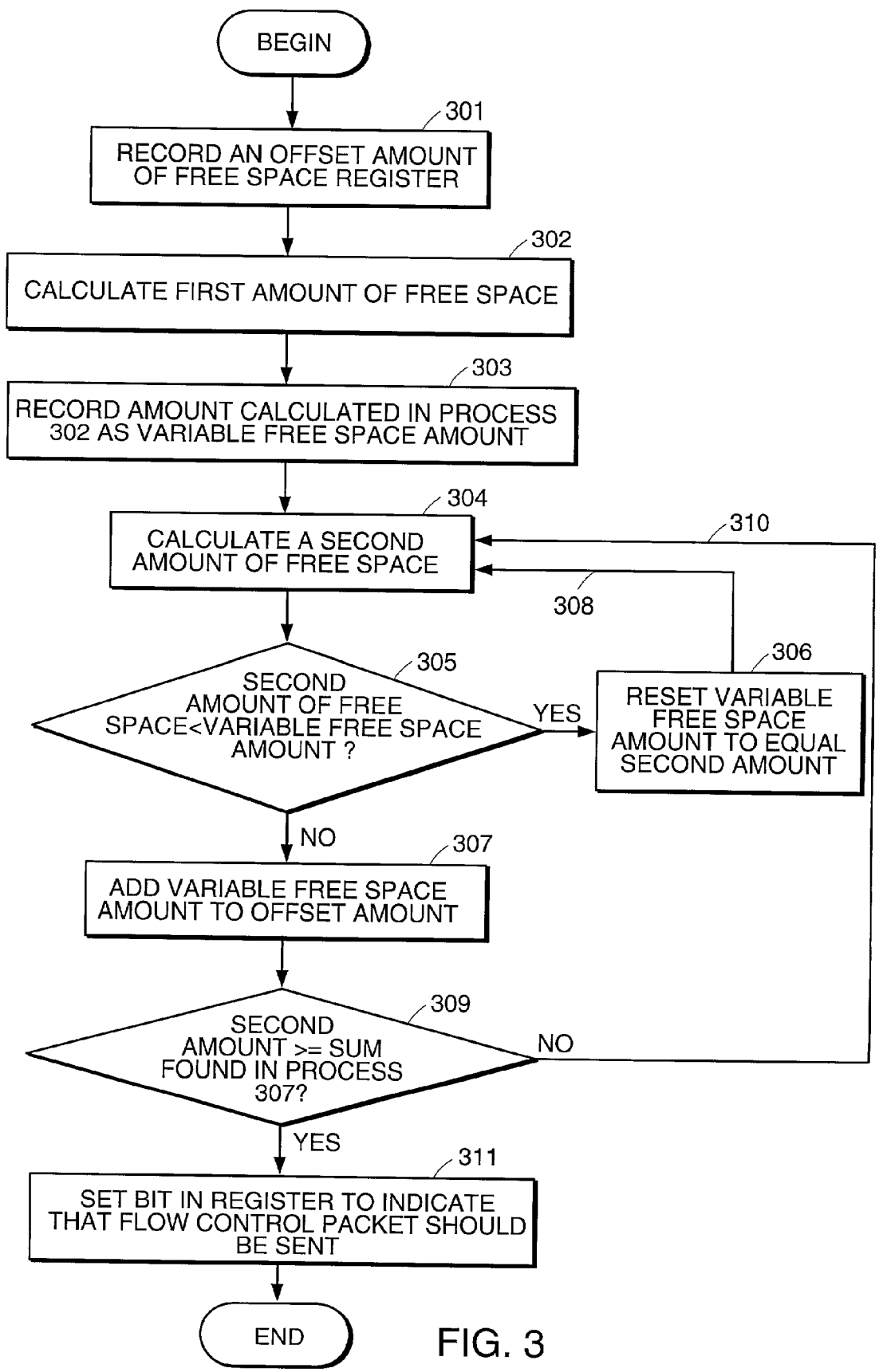
FIG. 3 is a flow chart illustrating another embodiment of the invention.

FIG. 3 is a flow chart illustrating a specific embodiment of the free space monitoring and threshold checking. In this embodiment a variable free space amount is tracked. In process 301, an offset of free space is recorded in a register associated with the receiving device. This offset may be a programmable quantity of space designed to create a "comfort zone" of free space to make the sending of a flow control packet worthwhile. The free space in the buffer is determined 302 to initialize the variable free space amount. This first quantity is recorded 303 in a register that is in communication with the receiving device. A second amount of free space is determined at a next time in process 304. The second amount of free space is compared to the variable free space amount in the register. If the second amount of free space is less than the variable free space amount 305, then the variable free space amount is updated 306 to equal the second amount of free space, and the amount of free space in the buffer is calculated again as indicated by arrow 308. If, however, the second amount of free space is greater than or equal the variable free space amount, then the variable free space amount is added 307 to the offset of free space and the second amount of free space is compared 309 to the resulting sum. The variable free space amount plus the offset is the threshold free space amount that triggers a flow control packet. If the second amount of free space is less than the threshold, then the variable free space amount stored in the register remains the same and another calculation of the amount of free space is performed as indicated by arrow 310. If the second amount of free space calculated is greater than or equal to the sum of the variable free space amount and the offset, then a bit in the register is set 311 to indicate that a flow control packet should be sent. The bit triggers the sending of a flow control packet. The flow control packet preferably includes an indication of the amount of available free space in the receiving buffer. Any time a flow control packet is sent, the process begins again and the variable free space amount is reset to the current amount of free space available.

Figure 4:
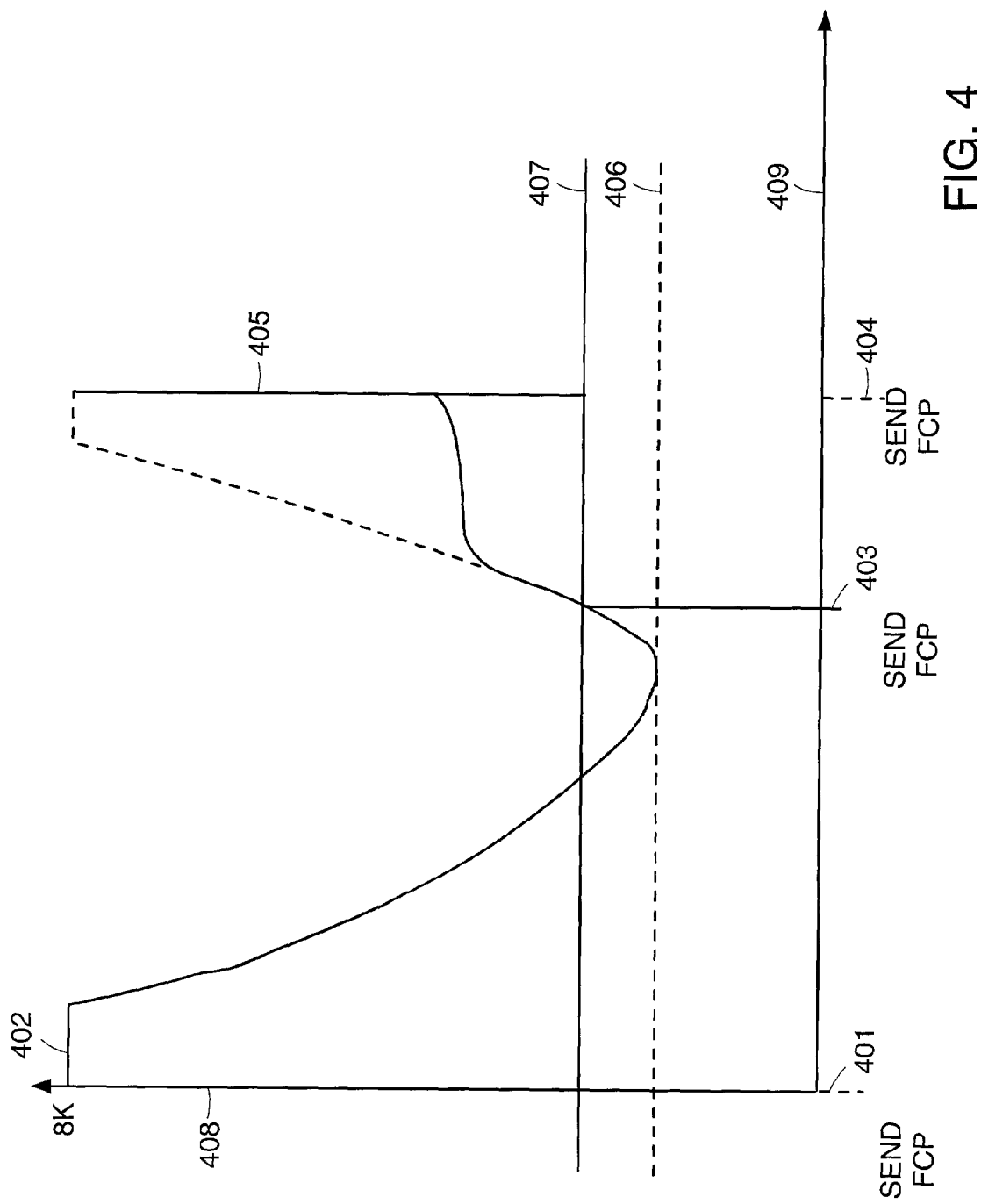
FIG. 4 is a graphical illustration of buffer space utilization with respect to FIG. 3.

The method of FIG. 3 serves to improve use of buffer space as can be seen in FIG. 4. Here, the x-axis 409 indicates clock cycles and the y-axis 408 indicates the amount of buffer space available in a 8K buffering device. A first flow control packet 401 is sent when the buffer is empty and the buffer capacity is at 8K, indicated by 402. In accordance with the invention, a second flow control packet 403 will be sent when the buffer capacity is greater than an amount defined by the variable free space amount 406 added to an offset, the sum of which is shown at 407. If the second flow control packet was sent based on a time interval as is the case at 404, then sending of data packets might prematurely stall, because the sending device is unaware of the progress made by the receiving device in processing the received data and opening up free space in the buffer. The dashed line shows the free space opening up as data packets continue to be processed but new ones stop arriving. Solid line 402 shows that new data can continue to arrive after the flow control packet at 403 was sent. The free space remains steady where data is processed at the same rate that new data arrives. It is seen that the flow control packet at 403 advantageously increased the data throughput.

Figure 5:
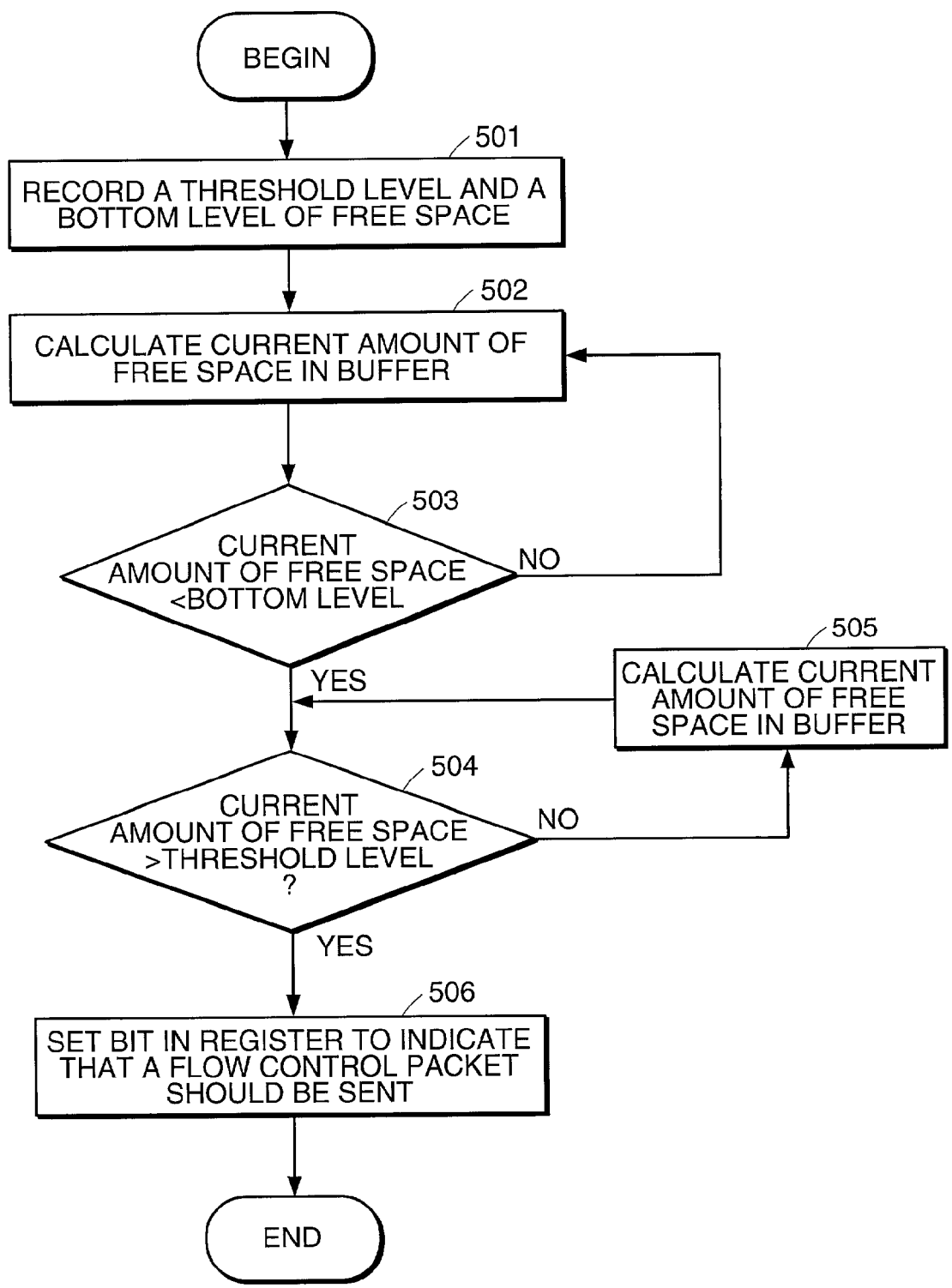
FIG. 5 is a flow chart illustrating a further embodiment of the invention.

Another embodiment for free space monitoring and threshold checking, illustrated in the flow chart of FIG. 5 also provides a threshold to improve buffer usage. A predetermined level of free buffer space and a bottom level of free space are recorded in a register associated with the receiving device in process 501. The predetermined level acts as a triggering threshold. The levels may be programmable. The current amount of free space in the buffer is determined 502 and this quantity is compared with the bottom level. Until the current amount falls below the bottom level 503, no flow control packets will be triggered responsive to available free space. Thereafter, the current amount of free space is compared 504 to the trigger threshold. As long as the amount of free space remains below the trigger threshold, the amount of free space in the buffer is repeatedly determined 505. If, however, the current amount of free space in the buffer becomes greater than or equal to the trigger threshold, then a bit in the register is set 506 to indicate that a data flow packet should be sent.

Figure 6:
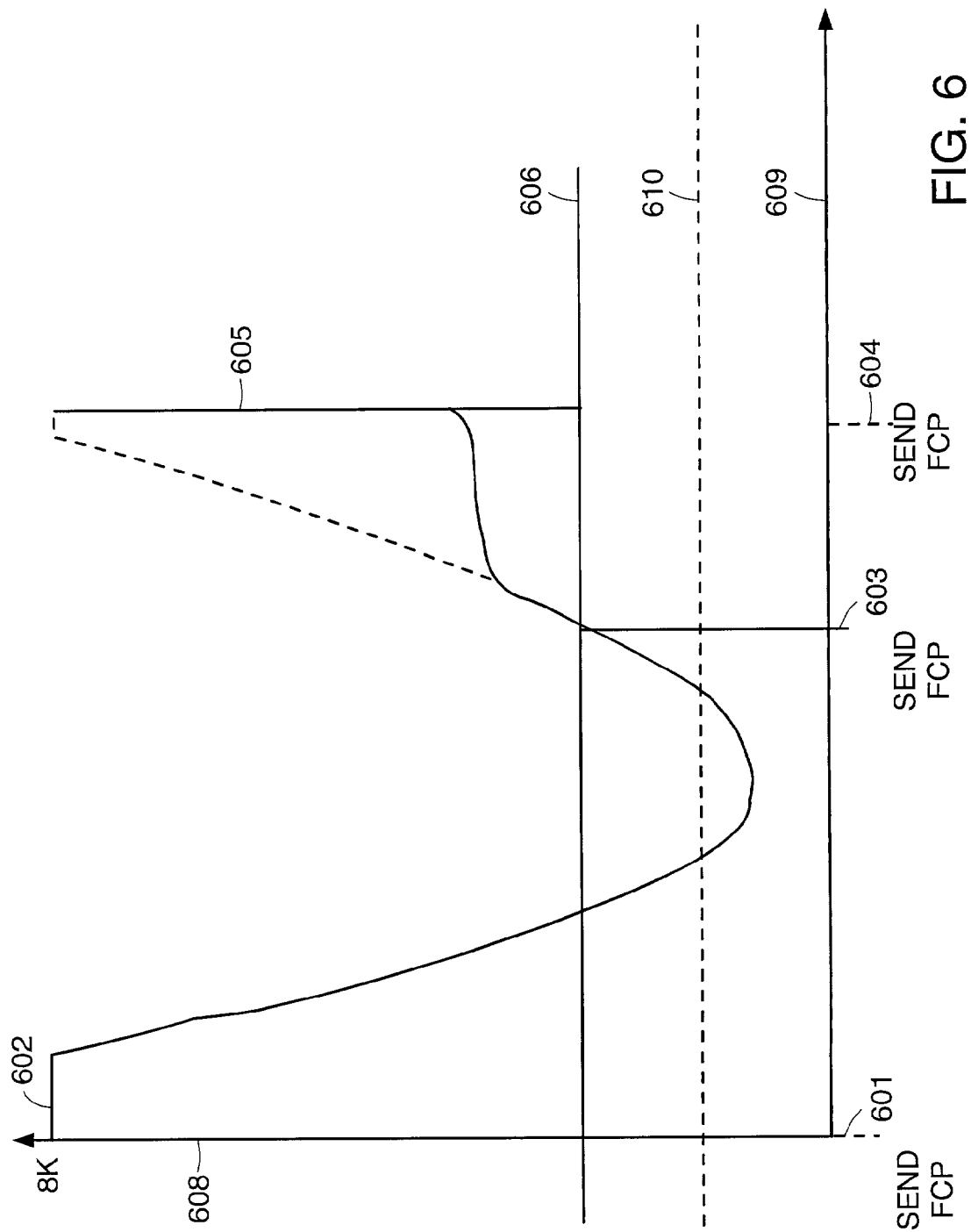
FIG. 6 is a graphical illustration of the buffer space utilization with respect to FIG. 5.

The method of FIG. 5 can also serve to improve usage of buffer space relative to the time based flow control packet as can be seen in FIG. 6. Here again, the x-axis 609 indicates clock cycles and the y-axis 608 indicates the amount of buffer space available in a 8K buffering device. A first flow control packet 601 is shown being sent when the buffer is empty and the buffer capacity is at 8K, indicated by 602. In accordance with this embodiment of the invention, a second flow control packet 603 will be sent when the buffer capacity falls below the bottom level 610 and then rises above an amount defined by the trigger threshold 606. If the second flow control packet was sent based on a time interval as is the case at 604, then the sending of data packets might become prematurely stalled. The use of the bottom and trigger thresholds generates a flow control packet in response to processing of data packets in the buffer that has freed up some buffer space.

Figure 7:
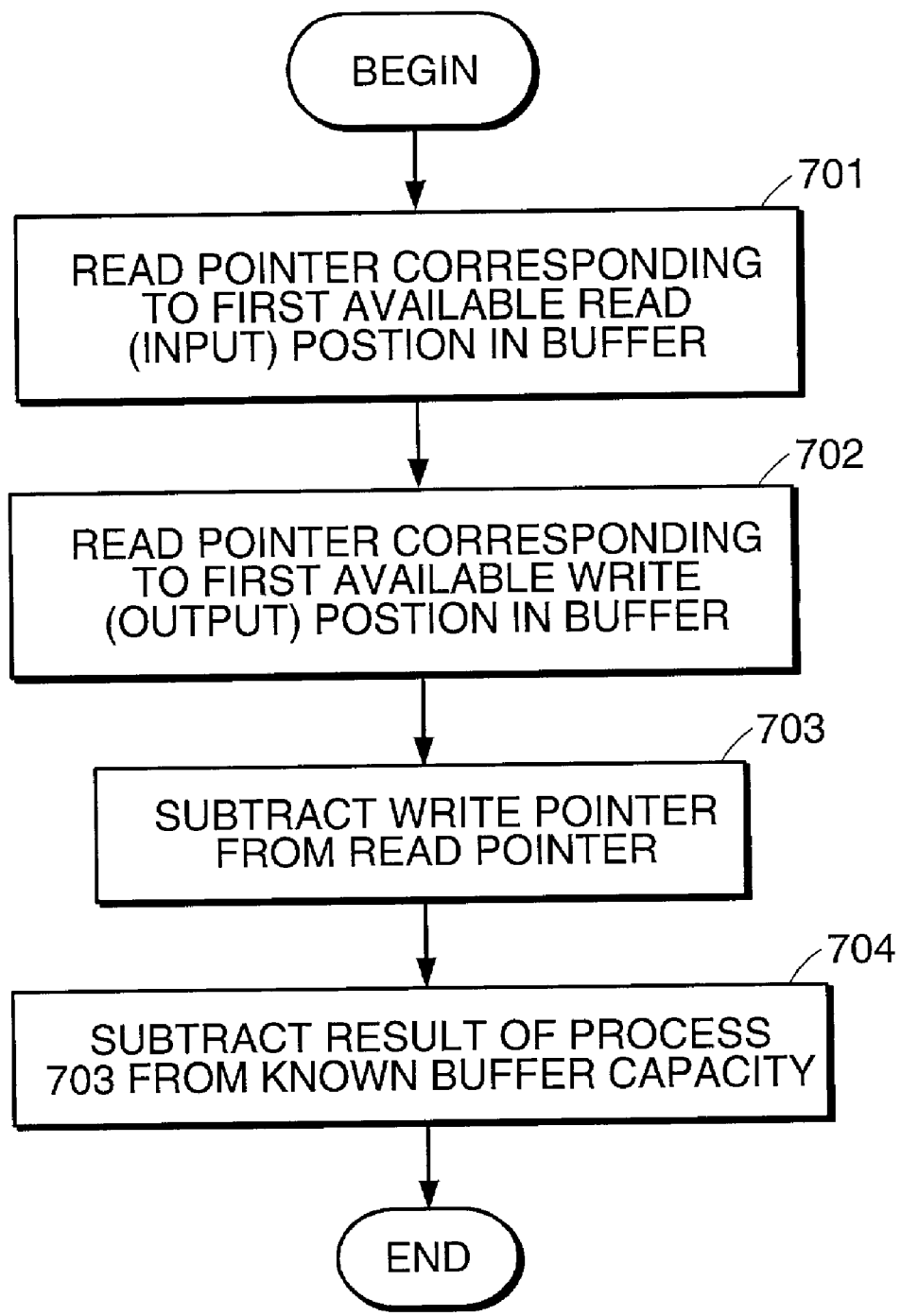
FIG. 7 is a flow chart illustrating a method of calculating buffer space in accordance with the embodiments of FIGS. 3–6.

FIG. 7 is a flow chart illustrating a method of calculating buffer space using buffer pointers for use in the methods described above. In process 701, a first pointer, corresponding to a first position in the buffer available to store data (the read position) input to the buffer is read. A second pointer, corresponding to a first position in the buffer from which a data will be output from the buffer (the write position) is also read 702. The write pointer is then subtracted from the read pointer in process 703 to render a total amount of data in the buffer and the result from process 703 is subsequently subtracted 704 from a known capacity or size of the buffer to render a total amount of free space in the buffer.

Figure 8:
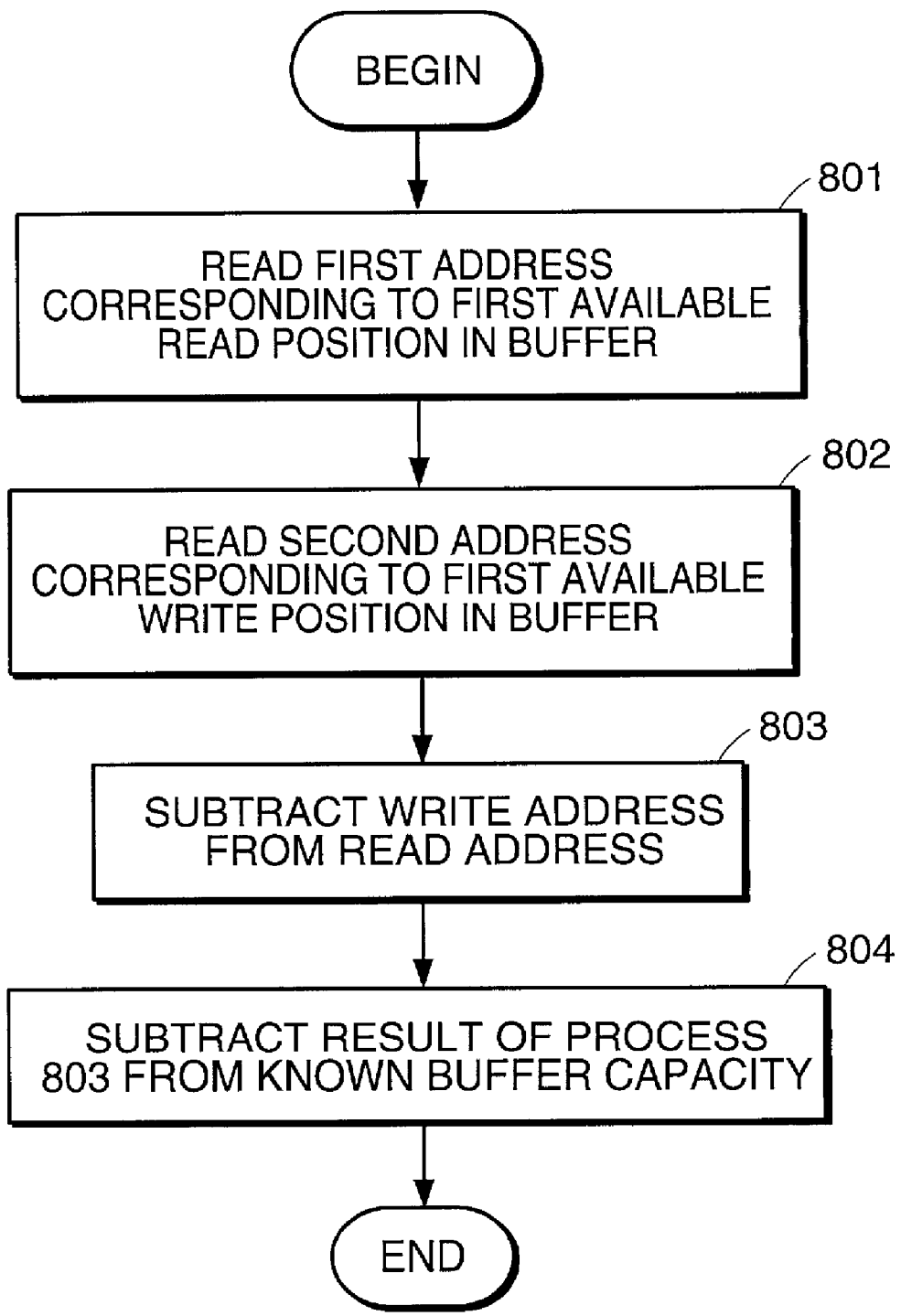
FIG. 8 is a flow chart illustrating another method of calculating buffer space in accordance with the embodiments of FIGS. 3–6.

The buffer space may also be calculated using addresses as is shown in FIG. 8. In accordance with this embodiment, an address corresponding to a first position in the buffer available to store data (the read position) input to the buffer is read in process 801. A second address, corresponding to a first position in the buffer from which data will be output from the buffer (the write position) is also read in process 802. The second address is then subtracted from the first address in process 803 to render a total amount of data in the buffer, and the result from process 803 is subsequently subtracted 804 from a known capacity or size of the buffer to render a total amount of free space in the buffer.

The free space monitoring and threshold checking methods described above may be used in conjunction with a time based flow control packet trigger as described above with relation to FIG. 2. The threshold checking methods will, at times, trigger a flow control packet when data is read out of a receiving buffer to a sufficient extent prior to expiration of the time period. This often permits the sending device to send additional data that would otherwise have been stalled in a strict time period based flow control triggering method.

Of course, it should be understood that various changes and modifications to the preferred embodiments described above will be apparent to those skilled in the art. For example, rather than using the FCCL of the specific embodiment in a flow control packet, the amount of free space can be indicated directly or by giving enough information to the sending node to calculate whether sufficient space is available. No particular method is required to determine the amount of free space in the receiving buffer. The triggering threshold may be fixed or variable. These and other changes can be made without departing from the spirit and scope of the invention and without diminishing its attendant advantages. It is therefore intended that such changes and modifications be covered by the following claims.

What is claimed is:

1. A method for triggering the transmission of a flow control packet between a receiving device and a sending device in a communication network, the method comprising:
   monitoring free space in a buffer associated with the receiving device to determine if the free space available in the buffer has increased above a threshold, wherein the threshold is relative to a variable free space amount;
   setting the variable free space amount to a lowest level of free space available monitored in the buffer since a flow control packet was last sent; and
   sending a flow control packet to the sending device in response to a determination that the free space available in the buffer has increased above the threshold, the flow control packet indicating the amount of free space available in the buffer.

2. The method of claim 1 wherein the threshold is a predetermined level.

3. The method of claim 2 further comprising, before monitoring to determine if the free space available in the buffer has increased above the threshold, monitoring free space in the buffer to determine if the free space available in the buffer has fallen below a bottom threshold that is smaller than the threshold.

4. The method of claim 1, wherein the threshold equals the variable free space amount plus a predetermined offset.

5. The method of claim 1 further comprising sending a flow control packet if a predetermined number of clock cycles has passed since a flow control packet was last sent.

6. In a communication network that requires a receiving device to send a sending device a flow control packet containing an amount indicative of available free space in a receiving buffer at least once every predetermined number of clock cycles, the method comprising:
   determining if the free space available in the buffer has increased above a threshold, wherein the threshold is relative to a variable free space amount;
   setting the variable free space amount to a lowest level of free space available monitored in the buffer since a flow control packet was last sent; and
   sending a flow control packet to the sending device in response to a determination that the free space available in the buffer has increased above the threshold.

7. The method of claim 6 wherein the threshold is a predetermined level.

8. The method of claim 7 further comprising before the act of determining, monitoring free space in the buffer to determine if the free space available in the buffer has fallen below a bottom threshold that is smaller than the threshold.

9. The method of claim 6 wherein the threshold equals the variable free space amount plus a predetermined offset.

10. The method of claim 6 further comprising sending a flow control packet if a given number of clock cycles, no greater than the predetermined number, has passed since a flow control packet was last sent.

11. A method for triggering the transmission of a flow control packet between a receiving device and a sending device in a communication network, the method comprising:
    setting a predetermined offset;
    determining an amount of free space in a buffer associated with the receiving device;
    recording the amount of free space in a storage location;
    updating the amount in the storage location as the amount of free space becomes less than the amount in the storage location;
    comparing the amount of free space in the buffer to the sum of the amount in the storage location plus the predetermined offset; and
    triggering a flow control packet when the amount of free space has increased a sufficient amount as determined by the comparison.

12. A method according to claim 11 wherein determining an amount of free space comprises subtracting a current amount of data in the buffer from a known capacity of the buffer.

13. A method according to claim 11 wherein determining an amount of free space comprises:
    reading a first pointer corresponding to a read position in the buffer;
    reading a second pointer corresponding to a write position in the buffer;
    determining an amount of used space between the second pointer and the first pointer; and
    calculating a difference between the amount of used space and a known capacity of the buffer to arrive at the amount of free space.

14. A method according to claim 11 wherein determining an amount of free space comprises:
    reading a first address corresponding to a read position in the buffer;
    reading a second address corresponding to a write position in the buffer;
    obtaining a difference between the second address and the first address to determine an amount of used space; and
    subtracting the amount of used space from a known capacity of the buffer to arrive at the amount of free space.

15. A method according to claim 11 wherein the buffer is a first in first out buffer.

16. A method according to claim 11 wherein the flow control packet includes an amount indicative of the amount of free space in the buffer.

* * * * *